United States Patent [19]

Filer

[11] 4,213,239

[45] Jul. 22, 1980

[54] TUBE EXTRACTOR

[76] Inventor: Burt Filer, c/o Heat Exchanger Tool Corporation, P. O. Box 2, Trevose, Pa. 19047

[21] Appl. No.: 950,276

[22] Filed: Oct. 11, 1978

[51] Int. Cl.² .......................................... B23P 19/02
[52] U.S. Cl. ........................................ 29/726; 29/252
[58] Field of Search ........................ 72/391, 393, 407; 29/726, 727, 252, 280, 282; 279/76

[56] References Cited

U.S. PATENT DOCUMENTS

| | | | |
|---|---|---|---|
| 2,135,861 | 11/1938 | Thompson | 279/76 |
| 2,319,216 | 5/1943 | Dewald | 72/393 |
| 2,697,872 | 12/1954 | Armstrong | 29/282 |
| 2,950,525 | 8/1960 | Duncan et al. | 29/252 |
| 3,507,028 | 4/1970 | Stellatella | 29/726 |
| 3,791,011 | 2/1974 | Keys | 29/726 |

FOREIGN PATENT DOCUMENTS 578107 6/1946 United Kingdom ...................... 72/391

*Primary Examiner*—Carl E. Hall
*Attorney, Agent, or Firm*—Zachary T. Wobensmith, 2nd; Zachary T. Wobensmith, III

[57] ABSTRACT

A tube extractor for extracting tubes from the tube sheets of a heat exchanger, which utilizes a fluid pressure activated broach which is expanded and drawn into the end of the tube to be removed without expanding the outside diameter of the tube, and which then withdraws the tube from the tube sheet.

10 Claims, 5 Drawing Figures

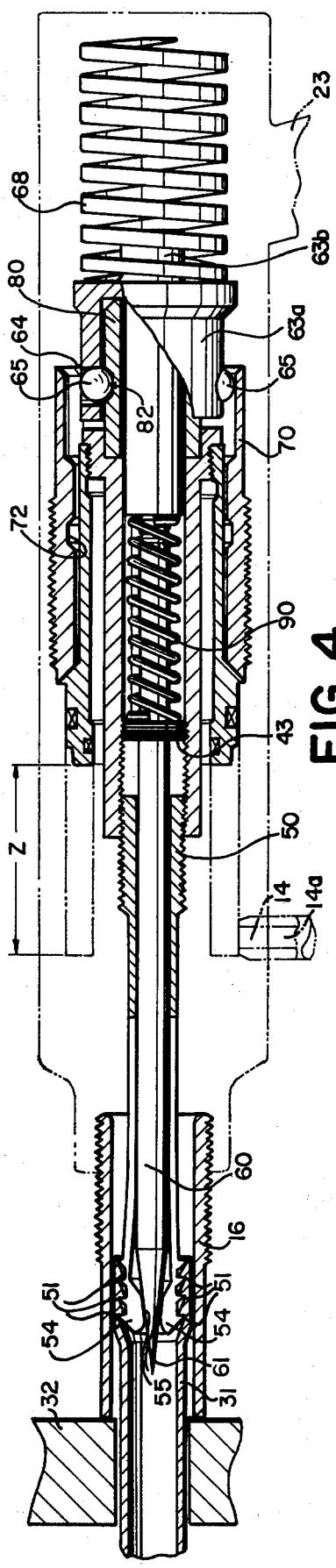
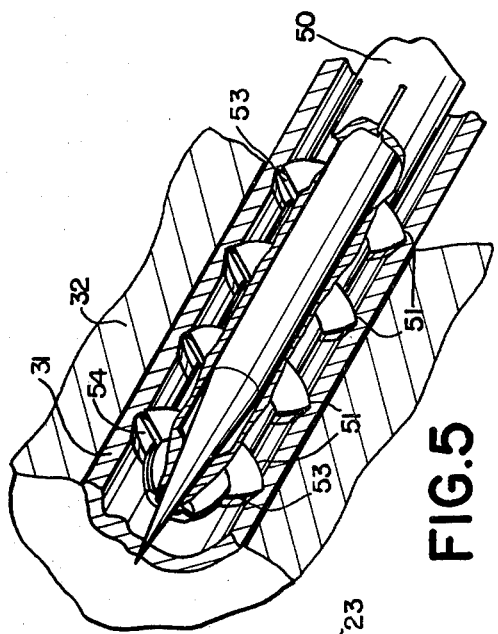
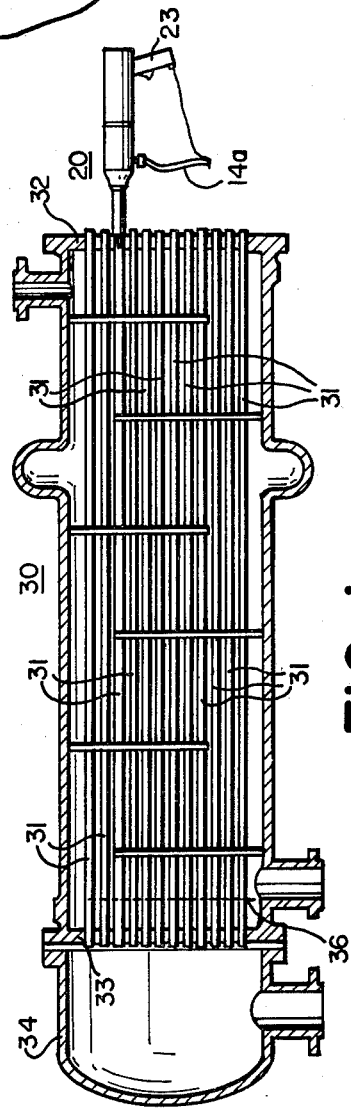
FIG. 4
FIG. 5
FIG. 1

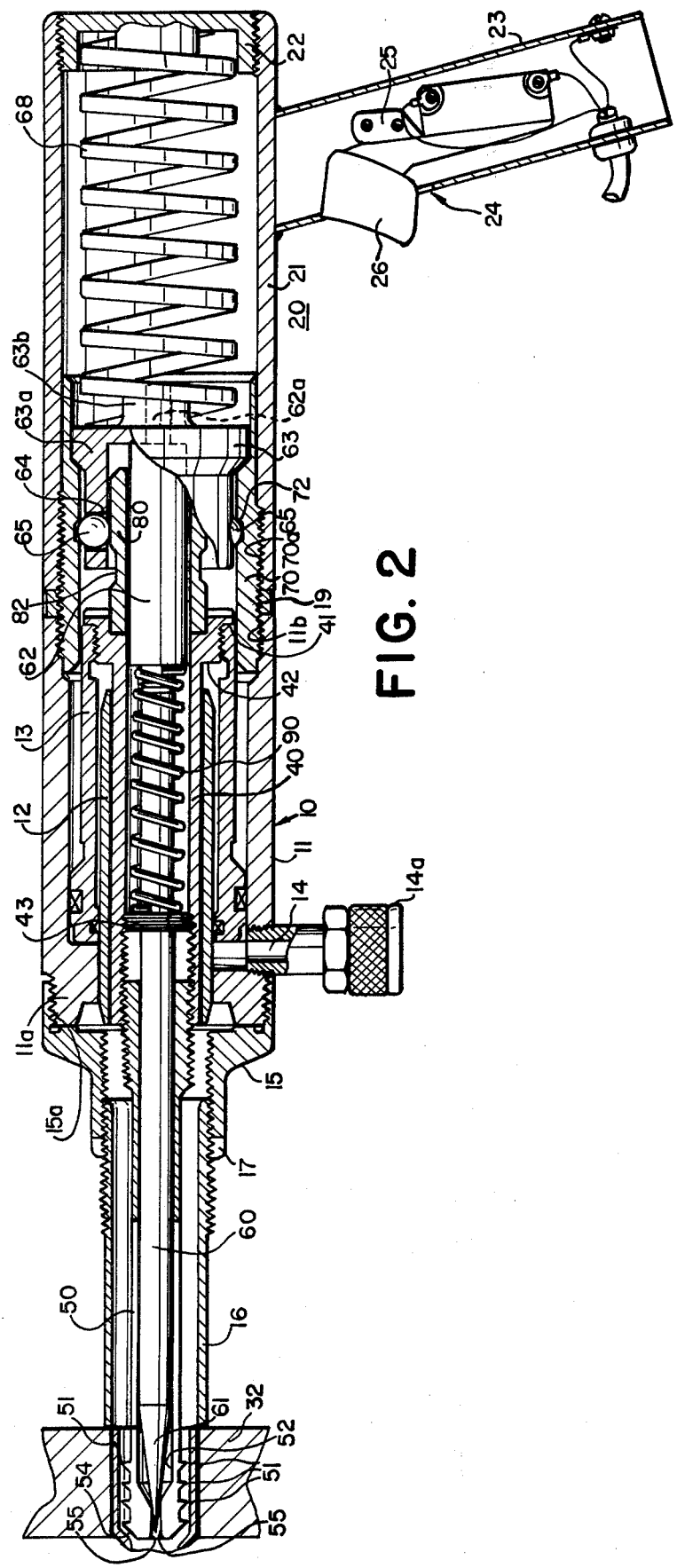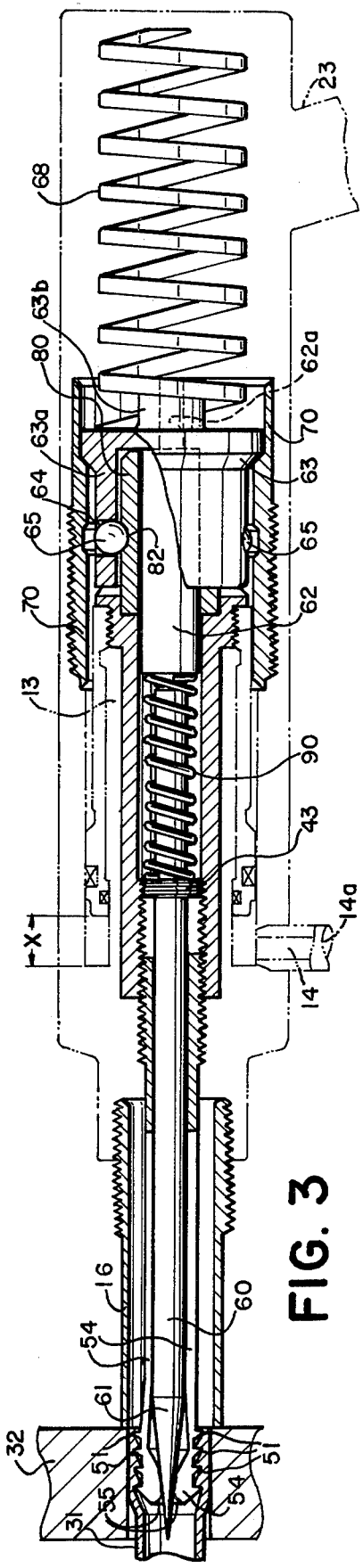
FIG. 2
FIG. 3

TUBE EXTRACTOR

BACKGROUND OF THE INVENTION

1. Field of the Invention

A tube extractor is disclosed of the hydraulically actuated type which removes tubes from a tube sheet of a heat exchanger by the expansion of a broach into the wall of the tube and then withdrawing the tube from the tube sheet.

2. Description of the Prior Art

A typical heat exchanger can utilize an outer shell with tube sheets at each end and tubes running from one end to the other which have their ends secured in the tube sheets by mechanical expansion or swaging. Heating or cooling mediums can pass over the tubes with fluid passing through the tubes to be cooled or heated. It is important that the heating or cooling medium and fluid not mix so that a close fit of the tube ends in the tube sheets is therefore quite important. The tubes are usually closely spaced together and in a typical example for three quarters inch diameter tubes on one inch centers in a three foot diameter tube sheet, some one thousand holes would be present in the tube sheet. Due to the corrosive and abrasive nature of the materials involved the tubes must be periodically replaced.

To replace the tubes they are generally cut between the tube ends and the expanded ends of the tubes forcibly withdrawn from the tube sheets an inch or two until they can be withdrawn by hand.

Various tools have been suggested for removing these tubes, a typical tool being shown in the U.S. Pat. to Armstrong, No. 2,697,872, which uses grippers having an internal taper at the forward end, arranged circumferentially around a rod and having a forwardly divergent conical surface, as is shown in FIGS. 2 and 4. Gripper claws 22 are held stationary as tension is applied to the rod 30, which action wedges the grippers into crushing contact with the inside diameter of the tube. A second piston then applies tension to the grippers directly to pull out the tube.

The Armstrong structure is subject to various problems as the mandrel is necessarily larger in diameter under the teeth, since it is forwardly divergent, which means that there is less cross section available for the grippers, which makes them more prone to breakage. In addition, tensile loading of the Armstrong mandrel makes it inherently fragile, since for the same cross section, most materials are stronger in compression than in tension. In the event of bad adjustment leading to failure of the mandrel, it will neck down and part with a snap. The forward part of it would then shoot out the front of the gun, with high velocity, and pose a very real hazard to a person working at the other end of the tube.

The U.S. Pat. to Miller, No. 3,613,212, illustrates the use of a tap of unusual shape for removing tubes from tube sheets wherein a threaded rotatable tap is engaged with the tube by turning and the tap and its mounting are then withdrawn. The Miller structure however does not illustrate any means of removing the tap and tube other than manual which would require considerable force to withdraw the tube from the tube sheet, is slow and could involve problems of getting the tube end off of the tap after withdrawal.

The U.S. Pat. to Chuplis, Jr., No. 3,120,700, illustrates a tube puller with a rotatable tap similar to Miller but does not use a tap of unusual shape as is disclosed in Miller.

The U.S. Pat. to Sipher, No. 3,367,011, illustrates a tube pulling device similar to Armstrong which utilizes gripper jaws which are expanded outwardly into the tube wall with the jaws longitudinally stationary producing a crushing action with high radial forces.

The U.S. Pat. to Keys, No. 3,791,011, shows a tube pulling device similar to and with the same limitations as Armstrong with longitudinally fixed radial expansion of gripping means into the tube wall and withdrawal of the tube end from the tube sheet.

The U.S. Pat. to Stellatella, No. 3,507,028, shows a hydraulic tube puller with radial expansion of an inner end portion of a tube gripping member into the tube wall similar to and with the same limitations as Armstrong.

The U.S. Pat. to Sismore, No. 3,835,520, shows the use of gripper jaws similar to Armstrong's, wedged into crushing contact by a forwardly divergent bar or mandrel.

The primary problem with all the structures shown in the prior art is that they impose an expansion force on the tube precisely at the point where it is engaged with the tube sheet which can adversely affect the thin ligament of metal between adjacent holes and cause the holes in the tube sheet to enlarge and not properly grip a new tube when it is expanded.

The apparatus of my invention, if properly adjusted, does not expand the tube ends radially but securely grips the tubes by the combined radial and axial movement of the cutting teeth for withdrawal, and possesses many other advantages.

SUMMARY OF THE INVENTION

This invention relates to a tube extractor of the pressure fluid actuated type which employs a broach which is inserted into a tube end, expanded into the tube wall and then withdrawn to remove the tube end from its hole in a tube sheet.

The principal object of the invention is to provide a tube extractor that is simple to use and does not cause damage to the tube sheet upon tube withdrawal.

A further object of the invention is to provide a tube extractor which has a long service life.

A further object of the invention is to provide a tube extractor which is safe in use.

A further object of the invention is to provide a tube extractor which is fast in operation and of light weight.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which:

FIG. 1 is a sectional view of a typical heat exchanger with the extractor of my invention shown therein in engaged position;

FIG. 2 is a vertical longitudinal sectional view of the tube extractor shown in FIG. 1 and in a starting position ready for use;

FIG. 3 is a view similar to FIG. 2 but showing the tube extractor in the position after gripping by broaching and ready for extraction;

FIG. 4 is a view similar to FIG. 3 showing the tube extractor upon completion of tube extraction; and FIG. 5 is a fragmentary perspective view, enlarged, of a portion of the tube extractor of my invention and showing the broach.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings a preferred embodiment of pressure fluid actuated tube extractor 20 is shown in FIG. 1 in position to extract a tube 31 from a typical heat exchanger 30. A header or waterbox 34 has been removed from the exchanger 30 at the right end to allow access to a tube sheet 32. In actual practice the headers 34 at both ends may be removed, and the tubes 31 internally cut behind the opposite tube sheet 33 such as along line 36, prior to tube extraction, which is necessary as the expanded portions at both tube ends are larger in diameter than the rest of the tube 31 which can be readily observed particularly in FIG. 2.

The force required for tube extraction is generated in a cylinder 10, preferably hydraulically operated, as shown in FIG. 2.

The cylinder 10 includes an outer wall 11, and an inner wall 12, which contains an annular piston 13. A port 14 is connected by a pipe 14a to a source of fluid under pressure (not shown). When the fluid under pressure is admitted through the port 14, it will force the piston 13 in a direction away from the tube sheet 32, as shown in FIGS. 3 and 4.

The outer wall 11 is threaded at its forward end 11a to engage mating threads 15a at the rear of front housing 15, which engages the rear of a hollow tubular depth stop 16, whose forward end bears against the tube sheet 32 for force application for tube withdrawal.

The relatively long threaded engagement of the tubular depth stop 16 in the front housing 15 provides depth adjustment of the broach teeth 51, as explained below, and can be secured in adjusted position by a front lock ring 17.

The cylinder wall 11 is internally threaded at its rearward end 11b to engage mating external threads 70a on an outer clutch sleeve 70. The rear lock ring 19 and the rear housing 21 are successively threaded over the outer clutch sleeve 70. The end of the rear housing 21 is threaded internally to receive an end cap 22.

A handle 23, which is shown as a hollow rectangular tube, may be welded to the rear housing 21. A trigger switch 25 fits in the handle 23 through its lower end, and is secured within it by appropriate screws and spacers (not shown) with the movable trigger portion 26 protruding through a slot 24 in the handle 23.

The parts just mentioned are preferably made of aluminum or titanium to reduce their weight.

The moving parts of the tool are all connected to or driven by the hydraulic piston 13.

The piston 13 is internally threaded at its rearward end to engage a sleeve 40, and bottoms against a shoulder 41 for additional strength. A second shoulder 42 reduces the diameter of the sleeve 40 so that it will pass easily through the bore of the internal cylinder wall 12. The bore of the sleeve 40 is threaded internally at its forward end and receives a jam nut 43 at the bottom of the thread.

A broach 50 is provided which has a plurality of circumferential pointed cutting teeth 51 at its end which teeth are profiles of right triangles with the vertical side facing to the right as shown in FIGS. 2, 3 and 4. The broach 50 has a substantially uniform interior bore 52 extending from the back nearly to the front, where it tapers convergently. The bore 52 may be conveniently formed with a drill bit of well known type which has an acute tip. The broach 50 has a plurality of spaced slits 53, four being shown, extending back from the end, and forming a plurality of radially flexible fingers 54, with interior end cam or wedge faces 55.

A mandrel 60 is provided which slides freely in the bore 52 and has a conical point 61 at its forward end, preferably of a greater acute angle than that of the back of the faces 55, and located with its point 61 interiorly of the faces 55.

It can be seen that when mandrel 60 is held stationary and broach 50 is moved rearwardly, the faces 55 will be forced radially outwardly and move the ends of the fingers 54 outwardly to cause the teeth 51 to cut into the tube wall.

The mandrel 60 extends rearwardly through the jam nut 43 and is in threaded engagement with a clutch stem 62 at its end.

The clutch stem 62 has a short cylindrical stub 62a at its end which is pressed into permanent engagement with a hub 63b forming part of a cup 63a of a clutch cage 63.

The clutch cage 63 has the cup 63a thick walled with the open end facing forward and with several equally spaced radial holes 64 drilled through the wall in circumferential alignment near the open end. Each hole 64 confines a hardened ball 65, whose diameter is greater than the thickness of the wall of the cup 63a.

An externally threaded outer clutch sleeve 70 guides the annular piston 13 as it travels back and forth, and its forward end provides a positive stop for the piston 13 at the end of its stroke. A chamfered internal groove 72 receives the portions of balls 65 which protrude from clutch cage 63. The relatively long external thread on the outer clutch sleeve 70 facilitates preloading of the main return spring 68 when assembling the rear housing 21.

An inner clutch sleeve 80 is provided which slides over the stem 62 and within the cage 63, with its forward end permanently engaged in a counterbore on the back of the sleeve 40. The larger diameter of the inner clutch sleeve 80 is sized to hold the balls 65 in an outward position and the smaller diameter at the bottom of the chamfered groove 82 is sized to hold them in an inward position. It should be noted that when the inner sleeve 80 is moved rearwardly to contact the bottom of the cage 63, the balls 65 can move out of the groove 72 and into the groove 82.

A broach return spring 90 is provided within the sleeve 40 and surrounding the mandrel 60. One end of the spring 90 abuts against the jam nut 43, and the other end abuts against the clutch stem 62. The spring 90 is preloaded during assembly to maintain permanent separating force between the jam nut 43 and the clutch stem 62.

The mode of operation will now be pointed out.

In FIGS. 2, 3 and 4 the sequence of operation as the extractor 20 pulls a tube 31 from tube sheet 32 is illustrated.

FIG. 2 shows the position of the structure prior to the operation of the actuating pressure.

FIG. 3 shows the position after the operator has pressed the trigger 26 which activates a pump (not shown) to pump oil under pressure through pipe 14a into port 14 and into the annular cylinder surrounding piston 13, and which has caused the piston 13 to move a short distance "x" from the position shown in FIG. 2.

The movement of piston 13 has caused the broach 50 to move into engagement with the stationary mandrel 60, the conical tip 61 forcing the teeth 51 into cutting engagement with the inner wall of tube 31. The combined radial and axial movement of teeth 31 cuts a series of wedge-shaped grooves 56 inside the tube 31. (See FIG. 5).

The pressure of the faces 55 against the mandrel tip 61 has exerted a net force to the right as shown in the drawings. The force on the tip 61 was translated through the clutch stem 62 and the clutch cage 63 to the balls 65. The balls 65 could not however, escape from the groove 72 of the outer clutch sleeve 70, which was held stationary as the balls 65 were held outward by inner clutch sleeve 80 until the position shown in FIG. 3 has been reached by movement through the distance "x".

Therefore during the first part of the cycle, the mandrel 60 is held stationary while the broach 50 is moved rearwardly. The pulling force developed by the action of the teeth 51 on the tube 31 is balanced by a compressive reaction between the depth stop 16 and the tube sheet 32.

The main return spring 68 has not yet been compressed beyond its set condition. The broach return spring 90 has been compressed the distance "x" since jam nut 43 has moved rearwardly this amount, while clutch stem 62 is still stationary. As shown in FIG. 3, the inner groove 82 is brought into axial alignment with the outer groove 72. The pressure between the balls 65 and the chamfered edge of the outer groove 72 forces the balls 65 to move into the inner groove 82.

Since the balls 65 no longer engage the stationary outer clutch sleeve 70, the clutch sleeve 80 will be free to drive clutch cage 63, stem 62 and the mandrel 60 to the right in concert with broach 50.

Up to this point the combined radial and axial movement of broach teeth 51 has caused them to cut well pronounced abutments 56 in tube 31, as is shown in greater detail in FIG. 5.

The return spring 68 has not yet moved, but its preload now resists further movement of piston 13, since the clutch is disengaged.

The broach return spring 90 has been compressed.

As shown in FIG. 4, the piston 13 has moved a distance "z" to complete its stroke, and has bottomed out against the front of the outer clutch sleeve 70 and the broach 50 has extracted the expanded portion of tube 31 well clear of the tube sheet 32.

The relative position of the mandrel 60 to the broach 50 has been maintained by the main return spring 68 whose resistance has served to clamp the clutch cage 63 against the inner clutch sleeve 80, after the clutch has disengaged. Without this arrangement, it is possible that the faces 51 could squeeze the mandrel tip 61 backward relative to themselves, causing the broach 50 to lose its engagement with tube 31. The separating force of the broach return spring 90 also acts to this end, so that main return spring 68 must be powerful enough to overcome both force effects.

The balls 65 have been carried loosely in the apertures formed by the holes 64 and the inner clutch groove 82, and they are constrained from falling out by the rearward extension of the outer clutch sleeve 70.

Since the extraction has been completed, at this point the operator releases the trigger 26, shutting off the pump (not shown). The pressure behind the piston 13 drops, and it begins to move to the left under the influence of the main return spring 68, with the operational sequence on the return stroke being the reverse of that just described.

The clutch cage 63 is returned to the position shown in FIG. 3, forced against the shoulder of outer clutch sleeve 70 by the relatively powerful return spring 68, and the mandrel 60 is again stationary, and in its starting position.

The relatively weak broach return spring 90, acting on the jam nut 43, now drives the broach 50 towards the position of FIG. 2, with the clutch balls 65 driven outwardly into engagement with the groove 72 by the chamfered edge of the inner groove 82. The further extension of the broach return spring 90 drives all parts back to their starting positions as shown in FIG. 2.

Throughout the return stroke piston 13 has forced oil steadily out through port 14 back to the pump (not shown) where suitable valving directs it back to a reservoir (not shown).

There are several adjustments which can be made to facilitate the operation of the tool. Referring to FIG. 2, the rear housing 21 may be unscrewed a few turns relative to the outer clutch sleeve 20, which lowers the effective force of the main return spring 68.

The relatively long threaded engagement of the depth stop 16 in the front housing 15 provides for depth adjustment of the broach 50 in the tube 31.

In like manner, the relatively long threaded engagement of the broach 50 in the sleeve 40 allows for adjustment of the starting position of the faces 55 relative to the mandrel tip 61, which is important, since it determines the radial expansion of the teeth 51.

In practice, the mandrel tip 61 is longer than the clutch engagement distance by a factor of 2:1 or greater. When the starting position of the faces 55 relative to mandrel tip 61 is that shown in FIG. 2, they will ride about halfway up the cone tip before the clutch disengages, and the teeth 51 will cut abutment grooves about halfway through the wall of tube 31.

However, if the broach 50 were unscrewed several turns forward, the faces 55 would not be as far up the cone tip 61 when the clutch releases and teeth 51 would not cut as deeply into tube 31, so that there is a possibility that they would simply skim metal off the inside of the tube 31 without extracting it from the tube sheet 32.

On the other hand, if the broach 50 was turned deeper into the sleeve 40, the teeth 51 could cut too deeply into the tube 31 so that the actual extraction of the tube 31 would start before the clutch disengages, and since the tube 31 would be moving axially with the teeth 55, cutting action would stop. The teeth 51 would still be expanding radially, and crushing the tube 31 into tighter contact with the tube hole which is to be avoided as this would induce added strain and wear on the tool, and could even damage the tube hole.

The correct starting position is easily found by starting with the broach 50 fully extended. The operator can by trial and error quickly arrive at the correct setting without causing any damage to the tube holes in the tube sheet 32.

It will thus be seen that apparatus has been provided with which the objects of the invention are achieved.

I claim:

1. A tube extractor for extracting expanded tube ends from the tube sheet of a heat exchanger which comprises
    an outer housing having a forward extension for engagement with the tube sheet and having a cylinder therein,
    a piston within said cylinder,
    expansible broach means secured to said piston and having cutting teeth for insertion into one of said tube ends,
    a mandrel actuated by said piston for intermittent movement thereof,
    said mandrel having a forwardly converging end portion for engagement with interior portions of said broach means,
    a fluid pressure supply connected to said cylinder for moving said piston to expand said broach means into cutting engagement with a tube end, and
    clutch means actuated by longitudinal movement of said piston for first rigidly locking and then upon further movement releasing said mandrel to move with said broach member for tube extraction.

2. A tube extractor as defined in claim 1, in which
    a resilient return member is provided between said clutch means and said housing for positioning said clutch means.

3. A tube extractor as defined in claim 1 in which
    a resilient return member is provided between said clutch means and said piston for positioning said piston in a starting position.

4. A tube extractor as defined in claim 1 in which
    said mandrel has said forwardly converging end for advance therealong of said broach means in a fixed position of said mandrel to advance said cutting teeth into combined radial and axial cutting engagement in the tube end.

5. A tube extractor as defined in claim 3 in which
    said resilient member in compressed condition urges said piston and said broach means from engagement with said mandrel thereby permitting said broach means to collapse radially and release the tube.

6. A tube extractor as defined in claim 1 in which
    said clutch means includes an inner clutch sleeve and an outer clutch sleeve with a clutch cage and connecting balls therebetween,
    said outer sleeve being stationary and having grooves for said balls in one position of said piston with respect to said cage for locking said cage from movement, and
    said inner clutch sleeve being axially movable with said piston and having grooves for reception of said balls in another position of said piston with respect to said clutch cage for movement of said cage and said mandrel simultaneously with said piston.

7. A tube extractor as defined in claim 6 in which
    a resilient return member is provided between said cage and said piston for positioning said piston and said broach means.

8. A tube extractor as defined in claim 6 in which
    a resilient return member is provided between said clutch cage and an end of said housing for positioning said clutch cage.

9. A tube extractor having in combination
    an outer housing,
    a cylinder in said housing having a fluid supply connection,
    a piston movable in said cylinder upon the application of fluid pressure thereagainst,
    broach means connected to said piston for engagement with and extraction of a tube,
    clutch means including an inner clutch sleeve, an outer clutch sleeve and a clutch cage and connecting balls between said clutch sleeves and said cage,
    said clutch cage being intermittently movable with said piston and having a resilient element interposed therebetween,
    said outer sleeve being stationary and having grooves for reception of said balls in one position of said piston with respect to said cage,
    said inner clutch sleeve being longitudinally movable with said piston and having grooves for the reception of said balls in another position of said piston with respect to said clutch cage.

10. The combination defined in claim 9 in which
    a resilient return member is provided between said clutch cage and an end of said housing for positioning said clutch cage.

* * * * *